United States Patent
Sato et al.

[15] 3,676,925
[45] July 18, 1972

[54] METHOD FOR MAKING MOLDED CARBON COMPOSITION RESISTORS

[72] Inventors: Kunio Sato; Kanji Sugihara; Takashi Wakabayashi; Tomio Ishida, all of Osaka, Japan

[73] Assignee: Matsushita Electric Industrial Co., Ltd., Osaka, Japan

[22] Filed: July 28, 1970

[21] Appl. No.: 58,780

[52] U.S. Cl. ................................29/613, 29/619, 252/511
[51] Int. Cl. ..............................H01c 1/02, H01c 17/00
[58] Field of Search..................29/614, 619, 610, 613, 616, 29/621; 338/224, 225; 252/511; 264/104, 105

[56] References Cited

UNITED STATES PATENTS

| | | |
|---|---|---|
| 2,903,666 | 9/1959 | Krellner.............................29/621 X |
| 3,013,240 | 12/1961 | McKnight..........................29/619 X |
| 3,037,266 | 6/1962 | Pfister...............................29/619 X |
| 3,382,574 | 5/1968 | Chadwick...........................29/610 |

*Primary Examiner*—John F. Campbell
*Assistant Examiner*—Victor A. DiPalma
*Attorney*—Wenderoth, Lind & Ponack

[57] ABSTRACT

A method of making a molded carbon composition resistor. A core mixture is prepared from a finely divided carbon black or graphite powder and silica powder in a resin at an elevated temperature for giving it the proper plasticity, and the mixture is cooled and crushed into granules. A sleeve mixture is prepared from silica powder in a resin at an elevated temperature for giving it the proper plasticity, and the sleeve mixture is cooled and crushed into granules. The core mixture is formed into an inner core and the sleeve mixture is formed into a sleeve around the inner core. Electrodes are inserted into the ends of the inner core. The method is improved in that prior to the steps of mixing it with the other materials, the silica powder for either the core mixture or the sleeve mixture, or both, is heated to a temperature of from 700 to 1500° C.

3 Claims, 4 Drawing Figures

Patented July 18, 1972 3,676,925

INVENTORS
KUNIO SATO
KANJI SUGIHARA
TAKASHI NAKABAYASHI
TOMIO ISHIDA

BY *Wenderoth, Lind & Ponack*
ATTORNEYS

METHOD FOR MAKING MOLDED CARBON COMPOSITION RESISTORS

BACKGROUND OF THE INVENTION

This invention relates to a carbon composition resistor, characterized by a high stability with respect to humidity, and more particularly to silica powders used in said carbon composition resistor, and to a method of making such a resistor using the silica powders.

A conventional carbon composition resistor comprises a conductive inner core having finely divided carbon black or graphite powder and silica powder dispersed in a resin, and an outer sleeve having finely divided silica powder dispersed in a resin. The silica powders are not subjected to any preliminary heat treatment. However, it has been difficult to form such a carbon composition resistor having unheated silica powder therein which has superior electrical characteristics particularly when operated in high humidity.

SUMMARY OF THE INVENTION

An object of the invention is to provide a method for making a molded carbon composition which has extremely high stability with respect to electrical resistance and other electrical properties such as current noise and soldering characteristics, particularly when operated in high humidity.

A further object of the invention is to provide an improved molded carbon composition resistor in which the silica powders used in the resistor have been heated prior to their incorporation therein.

These objects are provided by first heating a silica powder for incorporation into a resin for either the outer sleeve or the inner core of a molded carbon composition resistor, and then incorporating the heated silica powder with the carbon in a resin for either the core or the sleeve, or both, and then forming the core and the sleeve therearound.

BRIEF DESCRIPTION OF THE FIGURES

The invention will be set forth in the following detailed description taken together with accompanying drawings wherein.

DETAILED DESCRIPTION OF THE FIGURES

Figure 1:
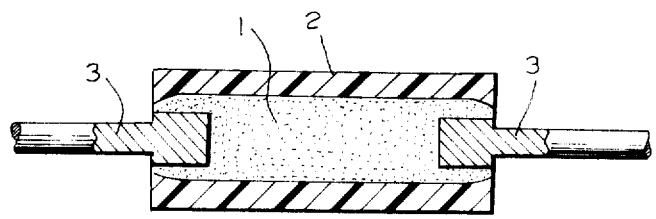
FIG. 1 is a cross sectional view of a molded carbon composition resistor according to the present invention.

Before proceeding with a detailed description of the Figures of this invention, the construction of a molded carbon composition resistor contemplated by this invention will be explained with references to FIG. 1. Reference character 1 designates a conductive inner core having finely divided carbon powder and silica powder dispersed in a resin. An outer sleeve 2 envelopes said conductive inner core 1. Said outer sleeve 2 has finely divided silicon powder dispersed in a resin. A pair of electrodes 3 are embedded in the ends of the carbon composition resistor.

In making molded carbon composition resistors, both conventional resistors and those according to the present invention, a mixture of finely divided carbon black or graphite powder and silica powder in any suitable and available resin is mixed well at a temperature of 50° to 100° C by any suitable and available hot rolling method until it acquires the proper plasticity. The suitable resin can be a thermal-setting binder such as, for example, phenol, melamine, silicon or epoxy resin. An operable composition of the mixture is 5 to 20 weight percent of carbon black or graphite powder, 60 to 80 weight percent of silica powder, and the balance resin.

An operable average particle size of said finely divided silica powder ranges from about 0.3 to 20 microns. The average particle size referred to herein is determined by a well known BET method, for example, described in J. Amer. Chem. Soc., 60, 309 (1938).

After being cooled to room temperature, the mixture is crushed and ground into granules to form the starting material for said conductive inner core.

A mixture of finely divided silica powder in any suitable and available resin is well mixed at a temperature of 50° to 100° C by any suitable and available hot rolling method until it acquires the proper plasticity. The suitable resin can be thermal-setting binder such as, for example, phenol, melamine, silicon or epoxy resin. An operable composition of the mixture is 75 to 89 weight percent of silica powder, and the balance resin. An operable average particle size of said finely divided silica powder ranges from about 0.3 to 20 microns.

After being cooled to room temperature, the mixture is crushed and ground into granules to form the starting material for said outer sleeve.

A unitary body having a conductive inner core enveloped by an outer sleeve is formed by any suitable and available method, for example, by an extrusion method or a pressing method. In an extrusion method, the aforesaid two mixtures in granule form are preheated and are simultaneously supplied to a nozzle for extrusion. The extruded body is in a long cylindrical form and is cut into many short cylinders having the desired length. In a pressing method, the conductive inner core and the outer sleeve are separately formed by pressing and then are combined together to form a short cylinder by any suitable method.

The short cylinder is provided, at both ends, with two electrode leads by any suitable method. For example, the short cylinder is inserted in a molding die, heated to a temperature of 160° to 230° C, and then is pressed by two punches having two electrode leads inserted therein. A pressing pressure of 400 to 1,000 kg per sq. cm. is applied for a time period of 30 to 180 seconds to embed the two electrode leads in the short cylinder.

If necessary, the finished resistor is further heated at a temperature of 130° to 170° C for 5 to 48 hours to obtain more stable electrical properties.

The improvement in the method according to the invention is to heat at least one of said silica powders in the core or in the sleeve, or both at a temperature of 700° C to 1,500° C before incorporating it therein.

A carbon composition resistor according to the present invention has an extremely high stability with respect to electrical resistance and other electrical properties such as current noise and soldering characteristics particularly when operated in high humidity.

It has been discovered according to the present invention than when the silica powders for said conductive inner core or for the outer sleeve, or both, are preliminarily heated at a temperature of 700° to 1,500° C for 3 to 10 hours, the resultant resistor has an extremely high stability with respect to the electrical resistance and other electrical properties such as current noise and soldering characteristics.

Figure 2:
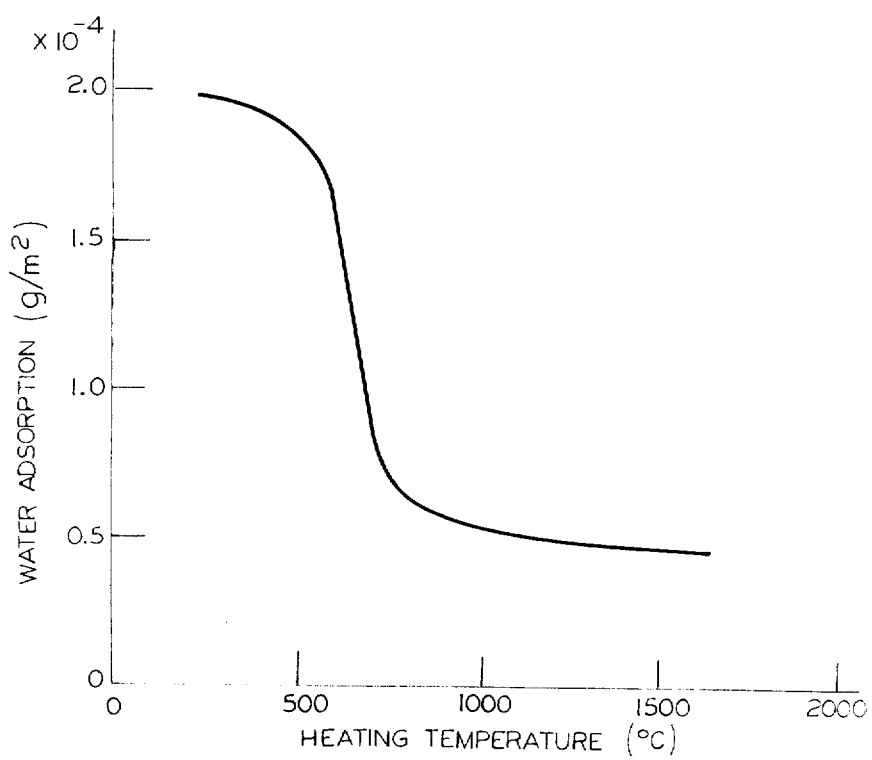
FIG. 2 is a graph illustrating water adsorption as a function of the heating temperature of silica powder.

The silica powder referred to herein has a high purity, being 99.00 to 99.90 weight percent of silicon dioxide and the balance, impurities. Particularly poisonous impurities are oxides acting as a mineralizer which promotes the sintering of silica powder, such as iron oxide, alkali metal oxide and calcium oxide. Said silica powder is obtained by crushing any suitable available natural stone or mineral having 99.00 to 99.90 wt. percent of silicon dioxide. The crushed silica powder having an average particle size of 0.3 to 20 microns is heated at a temperature of 700° to 1,500° C for 3 to 10 hours. The water adsorption of the crushed silica powder decreases with an increase in the heating temperature. An abrupt decrease in the water adsorption is observed for the crushed silica powder heated at 700° C for 3 to 10 hours. Above 700° C, the water adsorption decreases gradually with an increase in the heating temperature. Above 1,500° C, the crushed silica powder has a tendency to sinter together. Therefore, a heating temperature higher than 1,500° C is not desirable. FIG. 2 is a graph illustrating the relationship between the water adsorption and the heating temperature for silica powder obtained by crushing silica sand. The silica powder had a purity of 99.4 wt. percent of silicon dioxide and an average particle size of 10 microns. The water adsorption test was carried out in a manner similar to that described in a J. Polymer Sic., 7, 289 (1951).

EXAMPLE 1

Silica powder having a purity of 99.5 wt. percent of silicon dioxide is obtained by grinding silica sand in a wet ball mill. The obtained silica powder has an average particle size of 10 microns. Portions of the silica powder are heated in air for 5 hours at 700°, 1,000°, 1,200°, 1,300° and 1,500° C, respectively. A mixture of 72 wt. percent of said silica powder, 8 wt. percent of carbon black, 19.5 weight percent of phenol-aldehyde resin and 0.5 weight percent of stearic acid as a lubricant is prepared and is mixed well at 70° C by a hot rolling machine. The mixture is cooled and crushed into granules having a particle size of 5 to 30 mesh.

Other granules of mixture of 80 weight percent of said silica powder, 19.5 weight percent of phenol-aldehyde resin and 0.5 weight percent of stearic acid are prepared in a way similar to that described above.

Both kinds of granules are charged into a conventional extrusion press to form short cylinders each having an inner conductive core enveloped by an outer sleeve. The nozzle part of the extrusion machine is heated to 100° C. Each of the short cylinders is provided at each end with an electrode lead by a well known punching method operated at 180° C for 3 minutes at a pressure of 500 kg/cm².

The short cylinders each having two electrode leads embedded in the ends thereof are heated at 150° C for 8 hours to form stable resistors.

Figure 3:
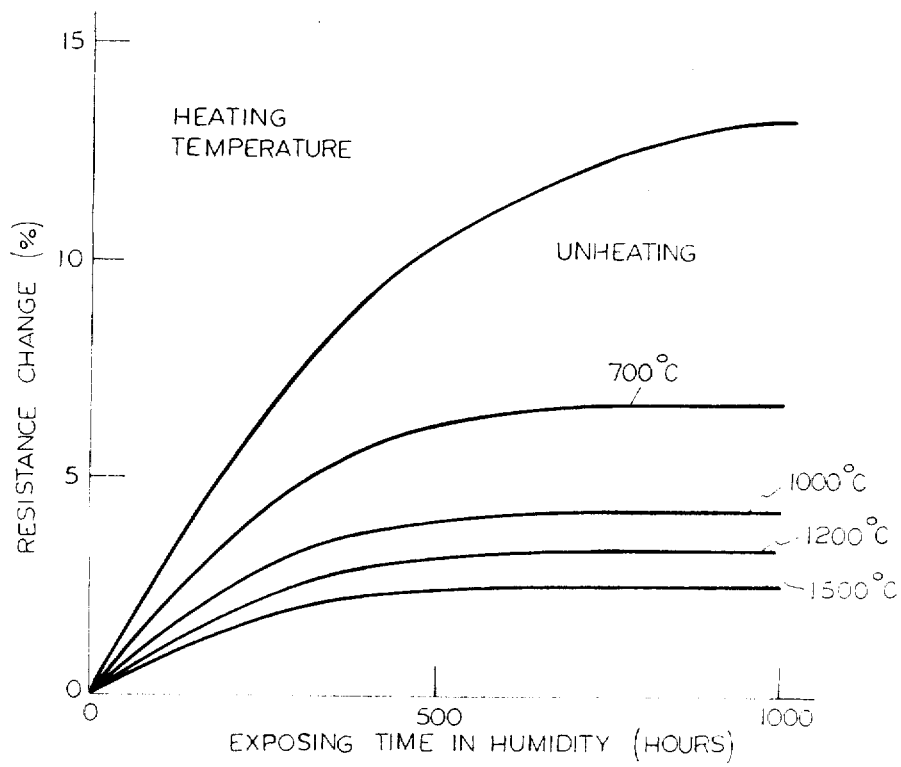
FIG. 3 is a graph illustrating the relation between the time exposed to humidity and the electrical resistance change of the resistors as a function of the heating temperature of silica powder.

The resultant resistors are subjected to a humidity test, current noise level test and soldering characteristic test. FIG. 3 is a graph illustrating the relationship between the time exposed to the humidity and the electrical resistance change of the resistors as a function of the temperature to which the silica powder is heated. Table 1 shows the testing results as compared with conventional silica powder which is not heated.

The humidity, current noise and soldering characteristics tests are carried out in a manner similar to that described in MIL-STD-02.

TABLE 1

| Heating Temp.(%) of silica powder | soldering characteristic | | current noise [1] ($\mu$V/V) | |
|---|---|---|---|---|
| | Initial | after humidity test [2] | Initial | after humidity test [2] |
| no heat | 1.0 | 3.0 | 0.8 | 1.5 |
| 700° | 0.5 | 1.0 | 0.6 | 0.8 |
| 1000° | 0.4 | 0.8 | 0.5 | 0.6 |
| 1200° | 0.3 | 0.5 | 0.4 | 0.5 |
| 1300° | 0.3 | 0.5 | 0.4 | 0.5 |
| 1500° C | 0.3 | 0.5 | 0.4 | 0.5 |

[1]) Measured utilizing Quan-Tech Labs Resistor Noise Test Set Model 315.
[2]) The humidity test is carried out at 40° C in a relative humidity of 95% for 240 hours.

EXAMPLE 2

Three kinds of resistors are prepared in a manner similar to that of example 1. The silica powder used is heated to 1,200° C or is not heated. The compositions of each of the mixtures are exactly the same as those of Example 1. Resistors of the first type have the heated silica powder only in the outer sleeve and have unheated silica powder in the inner conductive core. Resistors of the second type have the heated silica powder only in the inner conductive core and have unheated silica powder in the outer sleeve.

These resistors are subjected to the tests similar to those of example 1.

Figure 4:
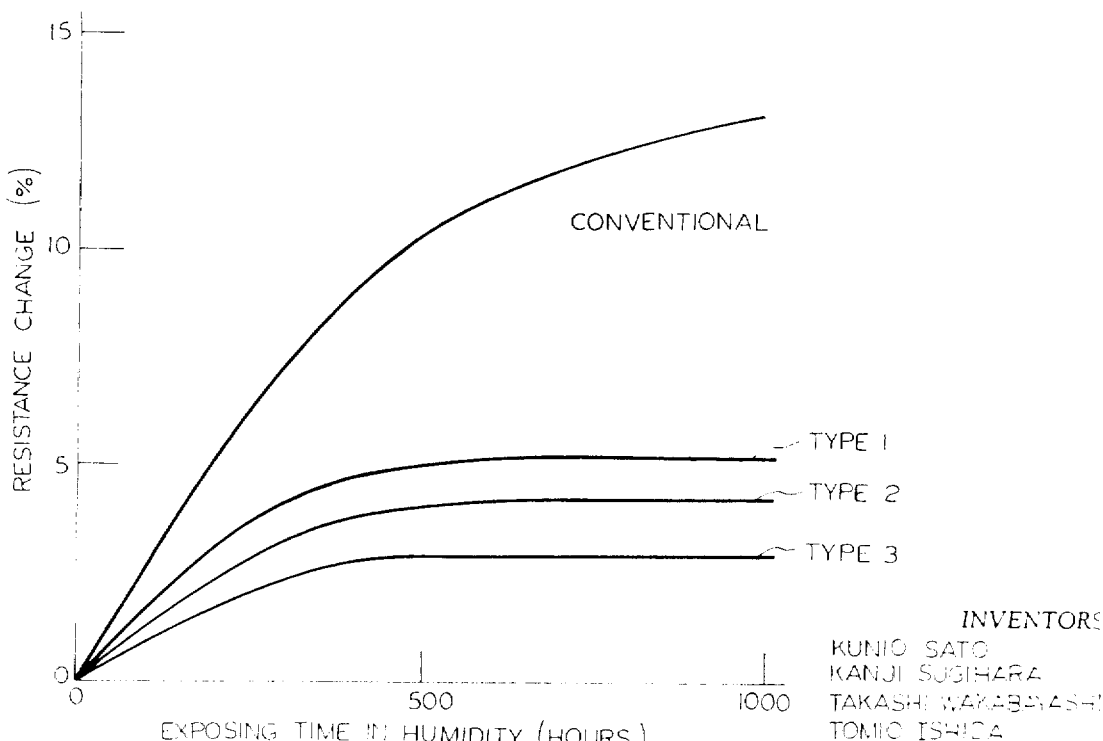
FIG. 4 is a graph illustrating the relation between the time exposed to humidity and the resistance change of a molded carbon composition resistor made from the silica powder.

FIG. 4 is a graph illustrating a relation between the time exposed to the humidity and the resistance change. Table 2 shows the test results.

TABLE 2[1])

| kinds of resistors | soldering characteristic (%) | | current noise ($\mu$V/V) | |
|---|---|---|---|---|
| | initial | after humidity test | initial | after humity test |
| Type 1 | 0.5 | 1.0 | 0.6 | 0.8 |
| Type 2 | 0.4 | 0.7 | 0.5 | 0.6 |
| Type 3 | 0.3 | 0.5 | 0.4 | 0.5 |
| conventional | 1.0 | 3.0 | 0.8 | 1.5 |

[1]) Measured in a manner similar to that described in Table 1.

Even a resistor using heated silica powder only in the outer sleeve is superior with respect to the humidity test and the other electrical tests to one using unheated silica powder in both the outer sleeve and the inner conductive core. The best results are obtained by using the heated silica powder in both the inner conductive core and the outer sleeve.

What is claimed is:

1. In a method of making a molded carbon composition resistor comprising the steps of preparing a core mixture of finely divided carbon black or graphite powder and silica powder in a resin at an elevated temperature for giving it the proper plasticity, cooling it and then crushing it into granules, preparing a sleeve mixture of silica powder in a resin at an elevated temperature for giving it the proper plasticity, cooling it and then crushing it into granules, forming the core mixture into an inner core and forming the sleeve mixture into a sleeve around the inner core, and in-serting electrodes into the ends of the inner core, that improvement of, prior to the steps of mixing the silica powder with the other materials, heating the silica powder for at least one of the core mixture and the sleeve mixture to a temperature of from 700 to 1500°C.

2. The improvement as claimed in claim 1 in which said silica powder is heated for a period of from 3 to 10 hours.

3. The improvement as claimed in claim 1 in which the silica powder for both the core mixture and the sleeve mixture is heated.

* * * * *